(12) United States Patent
Currie et al.

(10) Patent No.: US 6,831,375 B1
(45) Date of Patent: Dec. 14, 2004

(54) DIAGNOSTICS, PROTECTION, AND ISOLATION SYSTEM FOR ELECTRONIC DEVICES ON A VEHICLE DATA COMMUNICATION BUS

(75) Inventors: Richard J. Currie, Mount Vernon, WA (US); Richard Alan Mauk, Mount Vernon, WA (US)

(73) Assignee: Paccar Inc., Bellevue, WA (US)

( * ) Notice: Subject to any disclaimer, the term of this patent is extended or adjusted under 35 U.S.C. 154(b) by 659 days.

(21) Appl. No.: 09/655,906

(22) Filed: Sep. 6, 2000

(51) Int. Cl.[7] .................................................. B60L 1/00
(52) U.S. Cl. .................... 307/10.1; 307/9.1; 307/38; 307/39; 307/40; 307/41
(58) Field of Search ................................ 307/9.1, 10.1, 307/38, 39, 40, 41

(56) References Cited

U.S. PATENT DOCUMENTS

| | | |
|---|---|---|
| 4,725,698 A | 2/1988 | Takai et al. |
| 4,748,843 A | 6/1988 | Schäfer et al. |
| 4,831,560 A | 5/1989 | Zaleski |
| 4,853,850 A | 8/1989 | Krass, Jr. et al. |
| 5,061,196 A | 10/1991 | Weston et al. |
| 5,072,391 A | 12/1991 | Abe |
| 5,214,582 A | 5/1993 | Gray |
| 5,318,449 A | 6/1994 | Schoell et al. |
| 5,659,470 A | 8/1997 | Goska et al. |
| 5,737,711 A | 4/1998 | Abe |
| 5,815,071 A | 9/1998 | Doyle |
| 5,848,365 A | 12/1998 | Coverdill |
| 5,857,159 A | 1/1999 | Dickrell et al. |
| 5,890,080 A | 3/1999 | Coverdill et al. |

OTHER PUBLICATIONS

European Search Report for corresponding Application No. EP 01 30 7094, dated Feb. 6, 2004.

*Primary Examiner*—Robert L. DeBeradinis
(74) *Attorney, Agent, or Firm*—Christensen O'Connor Johnson Kindness PLLC

(57) ABSTRACT

A system for use in programming and diagnostics of electronic devices (32) in a vehicle includes a connector jack (36) having a plurality of electrical connection sites configured for electrical connection to the electronic devices (32) in the vehicle. A shorting plug (38) configured to removably engage the connector jack (36) interconnects the plurality of electrical connection sites to form a data communication bus. An electronics module (50) configured to removably engage the connector jack (36) in place of the shorting plug includes a plurality of switching units (56) that, when set in a closed state, electrically interconnect each of the electronic devices (32) to form the data communication bus. Each switching unit (56*a*, . . . ,56*g*) in the electronics module (50) is selectively and independently operable to electrically disconnect an electronic device (32) from the data communication bus, especially for programming and diagnostics of the electronic devices (32) in the vehicle.

40 Claims, 7 Drawing Sheets

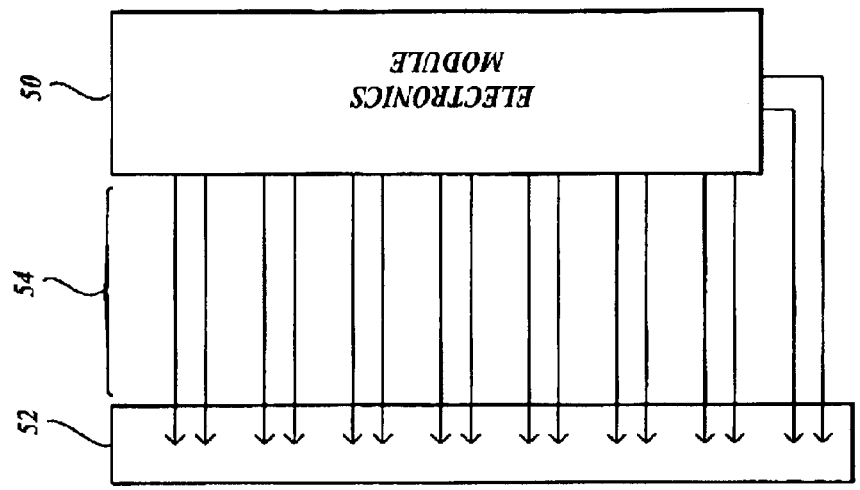
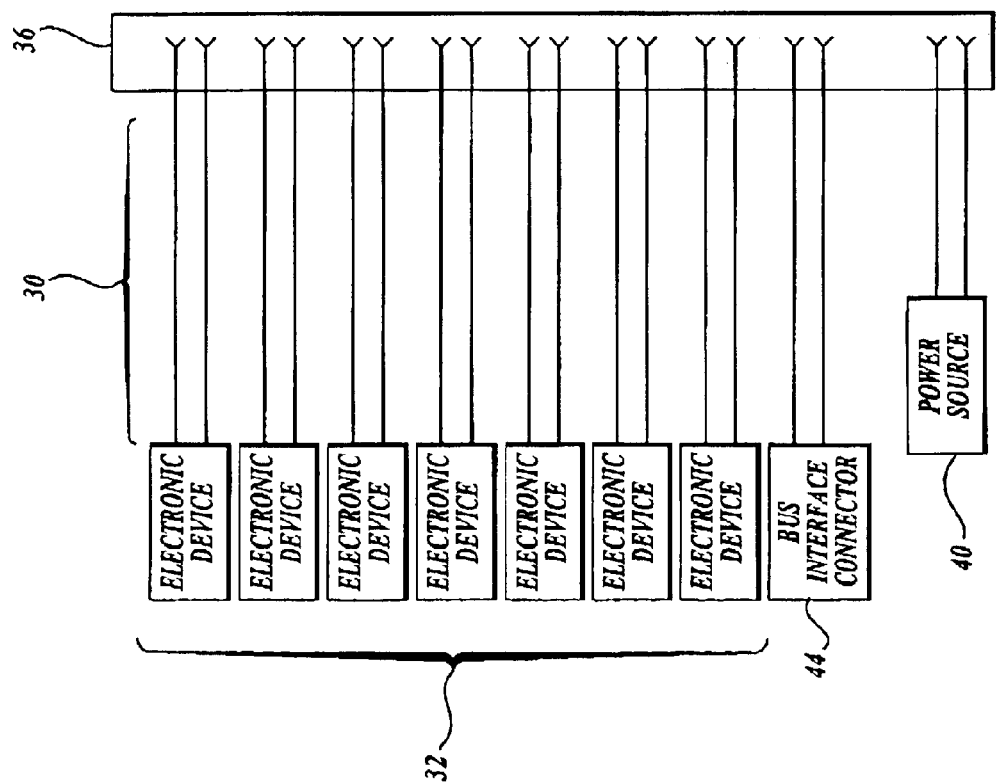
Fig. 4.

DIAGNOSTICS, PROTECTION, AND ISOLATION SYSTEM FOR ELECTRONIC DEVICES ON A VEHICLE DATA COMMUNICATION BUS

FIELD OF THE INVENTION

The present invention relates to vehicle electronic systems, and more specifically, to electronics for use in diagnostics, protection, and isolation of electronic devices connected to a data communication bus in a vehicle.

BACKGROUND OF THE INVENTION

Present-day vehicles often include electronic control modules or other electronically-controlled devices that exchange digital data information via a data communication bus implemented in the vehicle. The Society of Automotive Engineers (SAE) has established a number of protocols to standardize data communication in vehicle applications. For example, SAE J1708 is a commonly used specification for implementing the physical layer of a data communication bus in a vehicle. Data communicated on a J1708 data communication bus is typically transmitted in accordance with SAE J1587 data transmission protocol. Another commonly used specification for data transmission in a vehicle is SAE J1939. While these specifications are directed primarily to data communication in heavy duty vehicles (e.g., tractor-trailers), the specifications may also be applied to light-duty vehicle applications.

FIG. 1 illustrates a basic configuration of a data communication bus 10 implemented in accordance with SAE J1708. The data communication bus 10 is a two-wire bus to which a plurality of electronic devices is connected. For example, FIG. 1 depicts a dashboard electronic control module 12 and an engine electronic control module 14 connected to the data communication bus 10. FIG. 1 also illustrates other electronic devices connected to the data communication bus 10, such as an anti-lock brake system 16 and a trailer electronic control module 18. A bus interface port 20 connected to the data communication bus 10 permits an external diagnostics/programming device to access the data communication bus 10 to monitor and/or program the electronic devices in the vehicle (e.g., the dashboard control module 12, the engine control module 14, the anti-lock brake system 16, and the trailer electronic control module 18).

In vehicle production, electronic devices are typically installed in a vehicle and connected to the data communication bus 10 during the vehicle assembly process. The electronic devices are then programmed via the data communication bus 10 at a single location near the final assembly stage. Furthermore, when the vehicle is being serviced at a later date, it is customary to program replacement electronic devices via the data communication bus 10 after the replacement electronic devices are installed in the vehicle. Electronic devices that are added to the vehicle at a later date are also typically programmed via the data communication bus 10.

While programming electronic devices via a common data communication bus is believed to reduce the amount of hardware required and simplify the installation process, it can have unintended effects. For instance, programming codes intended to program one electronic device on the bus may inadvertently affect the programming of another device on the bus. In other circumstances, the programming codes intended to program a given device may conflict with information being broadcast on the bus by other devices. Since the programming codes for programming an electronic device are often proprietary to the manufacturer of the device and typically are not published, it is not feasible to administratively coordinate the multitude of manufacturers to avoid data interference on the bus. This problem becomes even more acute as the number of electronic devices added to the vehicle increases. A need, therefore, exists for methods and apparatus that can isolate electronic devices on the bus during programming to avoid cross-interference of the programming codes.

Furthermore, if an electronic device connected to the data communication bus 10 develops a fault or is improperly installed, the electronic device may cause system-wide bus disturbances. Such bus disturbances, or abnormalities, may include the transmission of invalid characters, excess packet length, babbling (i.e., transmission of excessive data that is valid but otherwise prevents other devices from transmitting), corrupt packets (e.g., packets with invalid checksums), or faulty hardware conditions that prevent data transmission (e.g., a shorted bus, or a reverse polarity on the bus). The result of these bus disturbances may range from a minor annoyance to creating an unsafe driving condition for the vehicle. Troubleshooting to identify an offending electronic device causing a bus disturbance is a costly and time-consuming exercise, particularly as the number of electronic devices being connected to the data communication bus increases. A need, therefore, exists for methods and apparatus that can isolate electronic devices from a data communication bus during diagnostics to identify electronic devices that are causing problems on the bus. The foregoing needs, and other shortcomings in the prior art, such as a need for real-time bus monitoring and logging of bus disturbances, are addressed by the present invention.

SUMMARY OF THE INVENTION

The present invention provides apparatus and methods for use in programming and diagnostics of electronic devices in a vehicle. The electronic devices communicate via a data communication bus in the vehicle. In one exemplary embodiment of the invention, a system is provided with a connector jack, a shorting plug, and an electronics module. The connector jack has a plurality of electrical connection sites that are configured for electrical connection to the electronic devices in the vehicle. The shorting plug is configured to removably engage the connector jack. When the shorting plug is engaged with the connector jack, the shorting plug electrically interconnects the plurality of electrical connection sites to form the data communication bus. The electronics module is configured to removably engage the connector jack in place of the shorting plug. The electronics module includes a plurality of switching units that connect to the plurality of electrical connection sites in the connector jack when the electronics module is engaged with the connector jack.

In accordance with the present invention, when each switching unit in the electronics module is set in a closed state, the electronic devices in the vehicle are interconnected in the electronics module to form the data communication bus. Preferably, each switching unit in the electronics module is operable separately from the other switching units. One or more of the switching units may be selectively set in an open state to electrically disconnect an electronic device from the data communication bus.

A method according to the present invention for use in programming electronic devices in a vehicle includes connecting the electronic devices to the data communication bus via switching units that are set in a closed state. An external programming device connected to the data communication bus transmits programming codes via the data communication bus to an electronic device in the vehicle that is to be programmed. In accordance with the present invention, the other electronic devices in the vehicle that are not to be programmed are electrically disconnected from the data communication bus by setting in an open state the switching units that connect the other electronic devices to the data communication bus. In this manner, only the electronic device intended to be programmed is connected to the data communication bus during programming. After the programming is completed, the other electronic devices that were electrically disconnected from the data communication bus may be reconnected by setting all of the switching units back in a closed state. The external programming device may also be removed from the data communication bus.

A method according to the present invention for use in diagnostics of vehicle electronic devices includes connecting the electronic devices to a data communication bus via switching units set in a closed state. A processing unit monitors data communicated by the electronic devices on the data communication bus for abnormalities. If an abnormality in the data is detected, the method includes setting one or more of the switching units in an open state to electrically disconnect from the data communication bus one or more of the electronic devices. The electronic devices may be disconnected from the data communication bus in a sequence until the abnormality is no longer detected on the data communication bus. In this manner, the electronic device that is causing the abnormality may be identified.

An electronics module constructed in accordance with the present invention includes a module connector configured to engage a connector jack in the vehicle having a plurality of electrical connection sites. The electrical connection sites are connected to the electronic devices in the vehicle. A set of switches in the electronics module includes a plurality of switching units that are connected to the module connector. When the module connector is engaged with the connector jack and the switching units in the electronics module are set in a closed state, the electronics module interconnects the electronic devices in the vehicle to form the data communication bus.

A processing unit in the electronics module is configured to selectively set each of the switching units in the set of switches in an open or closed state. Accordingly, the processing unit may direct one or more of the switching units to be set in an open state, and thus electrically disconnect an electronic device in the vehicle from the data communication bus. The processing unit may selectively disconnect an electronic device based on instructions received from a memory or a user input in the electronics module. The processor may also be configured to monitor data communicated on the data communication bus and selectively set one or more of the switching units in an open or closed state based on data communicated on the data communication bus. If an abnormality in the data communicated on the data communication bus is detected, the electronics module may electrically disconnect one or more of the electronic devices from the data communication bus to identify the electronic device that is causing the abnormality.

The electronics module may be embodied in a service-type apparatus that is connected to the data bus on a temporary basis, or it may be installed in a vehicle on a more permanent basis. In either case, the electronics module controls a set of switching units connecting the vehicle's electronic devices to the data communication bus, as previously described. The electronics module may also include an output device for reporting information to a user, such as information related to an abnormality detected on the data communication bus.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a pictorial diagram illustrating an electronics module and module connector constructed according to the present invention for connection to the connector jack shown in FIG. 3 in place of the shorting plug and cover plug;

DETAILED DESCRIPTION OF THE PREFERRED EMBODIMENT

Figure 1:
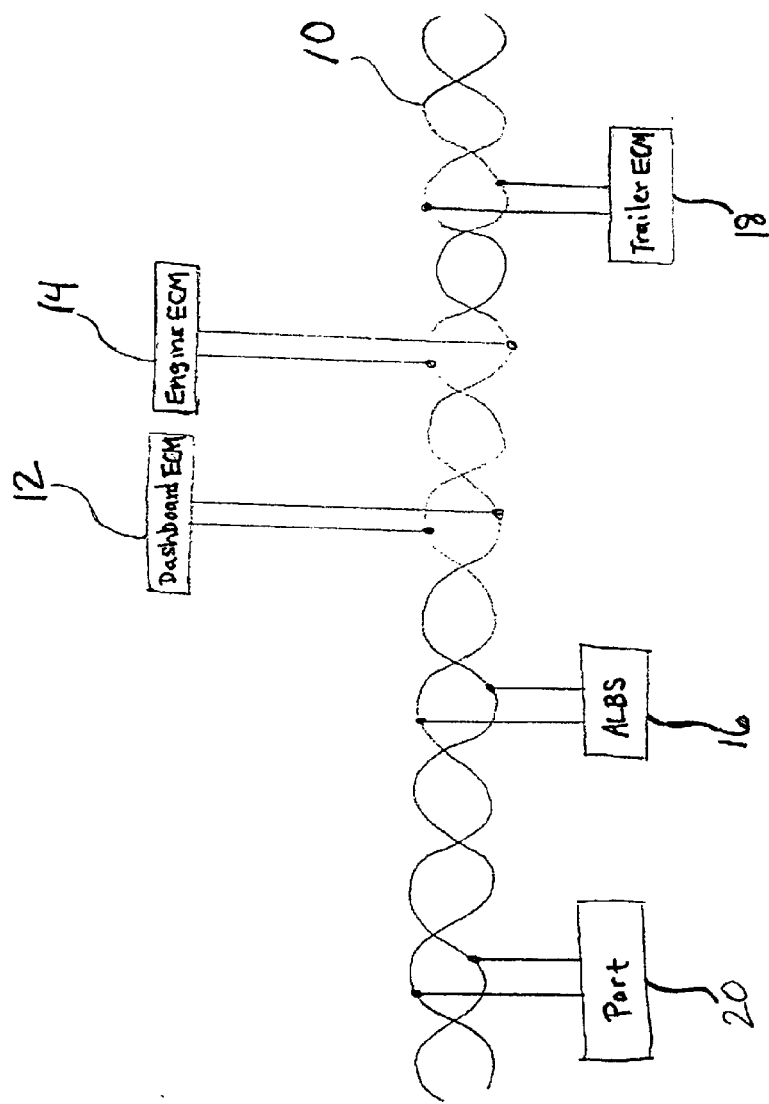
FIG. 1 is a pictorial diagram illustrating a prior art implementation of a J1708 data communication bus in a vehicle.
Figure 2:
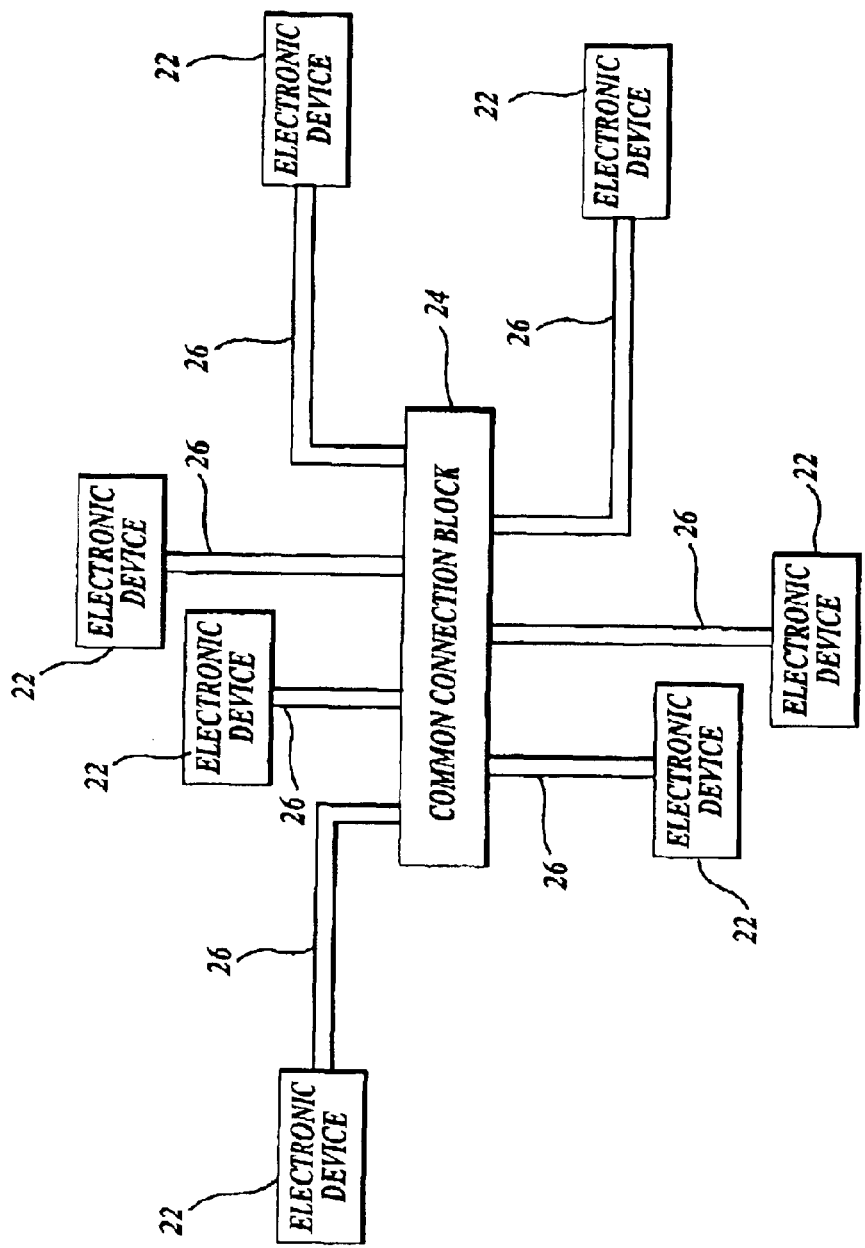
FIG. 2 is a pictorial diagram illustrating a typical data communication bus implemented in a star configuration.

FIG. 2 illustrates a typical data communication bus implemented in a star configuration. A variety of electronic devices 22 are connected to a common connection block 24 via bus lines 26. The common connection block 24 is a central junction block where the bus lines 26 are interconnected so that each of the electronic devices 22 may communicate data to any of the other electronic devices 22. The bus lines 26 provide a communication path between the electronic devices 22 (e.g., two-wire serial data communication in accordance with the SAE J1708 standard). For simplicity, the bus lines 26 are not shown pictorially as a twisted pair of wires, as shown in FIG. 1. The data communication bus shown in FIG. 2 is provided for background information to understand the implementation and use of the present invention.

Figure 3:
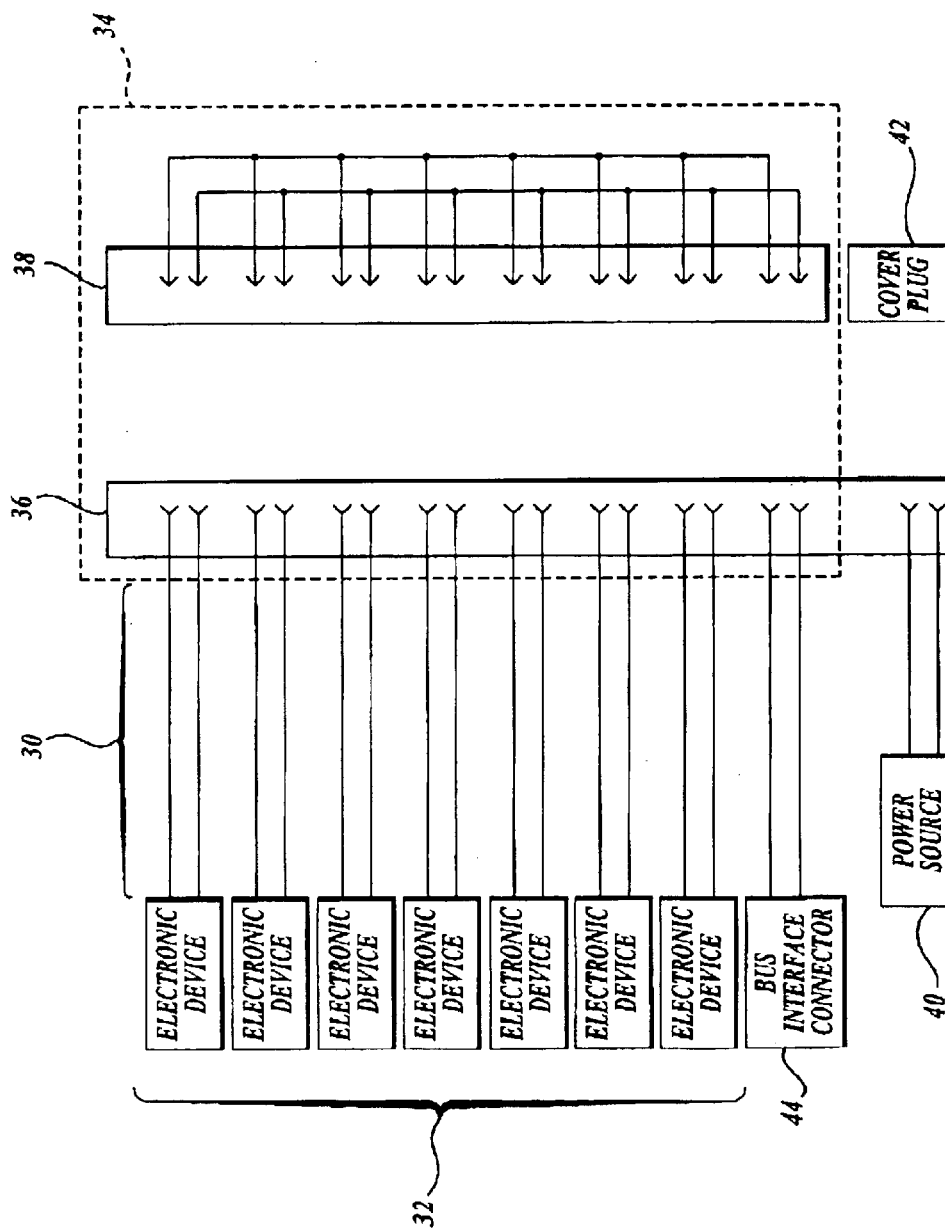
FIG. 3 is a pictorial diagram illustrating a data communication bus constructed according to the present invention, the data communication bus including a connector jack and a corresponding cover plug and shorting plug that, when inserted into the connector jack, allows electronic devices to communicate data with one another.

A data communication bus implemented in a vehicle in accordance with the present invention is shown in FIG. 3. The data communication bus includes bus lines 30 connected to a connector jack 36 that forms part of a common connection block 34. The bus lines 30 individually connect each of the electronic devices 32 to electrical connection sites in the connector jack 36. The bus lines 30 convey data messages to and from the electronic devices 32.

In the embodiment of the invention shown in FIG. 3, the common connection block 34 is comprised of a connector jack 36 and a corresponding removable shorting plug 38. When the shorting plug 38 is inserted into and engaged with the connector jack 36, wires in the shorting plug 38 interconnect the bus lines 30 to form the data communication bus and enable each of the electronic devices 32 to communicate data messages to any of the other electronic devices 32.

While the data communication bus illustrated in FIG. 3 may be implemented as an SAE J1708 two-wire data communication bus, the invention is not limited in application to a two-wire bus nor is it limited to the J1708 standard. The invention is applicable to other types of data communication links that may use different data transmission protocols.

The connector jack 36 may further include an electrical connection site for connection to a power source 40 such as a vehicle's 12-volt battery. The shorting plug 38 shown in FIG. 3 does not connect the power source 40 to the electronic devices 32. As will be understood from the discussion below, the power source 40 may be used to provide power to an electronics module configured to engage the connector jack 36 in place of the shorting plug 38.

When the shorting plug 38 is inserted into the connector jack 36, a removable cover plug 42 is preferably inserted in the connector jack 36 to cover the unused power source connection site. The cover plug 42 protects the connection site to the power source 40 from dirt and other contaminants, and prevents accidental contact of wires or other electrically-conducting objects with the power source connection. The cover plug 42 may be formed separately from the connector jack 36, or may be attached to the connector jack 36, e.g., by an integral hinge, so that when the cover plug is rotated about the hinge to a closed position, the electrical connection site to the power source 40 is covered.

For purposes of illustration, FIG. 3 depicts the connection of seven electronic devices 32 to the connector jack 36, though the present invention may be applied to a data communication link that enables any number of electronic devices to communicate with one another. For example, the electronic devices 32 may include (but are not limited to) an engine electronic control unit that controls engine operation, a transmission electronic control unit that controls the vehicle's transmission, an anti-lock braking system that interfaces with the vehicle's anti-lock brakes, a dash unit that receives information for display, a digital message center that displays information to the operator of the vehicle, a trailer unit that interfaces with trailer components, one or more customer accessories added to the vehicle, such as a GPS unit, etc. Any or all of these units or systems may be connected as electronic devices 32 to the connector jack 36.

FIG. 3 also illustrates a bus interface connector 44 connected to the connector jack 36. The bus interface connector 44 allows external equipment to access the data communication bus. For example, an external programming device may be connected to the data bus via the bus interface connector 44 to communicate programming codes to the electronic devices 32 on the data bus. In the tractor-trailer industry, the bus interface connector 44 typically has a unique design often referred to as a Deutsch connector because the Deutsch Company of Hemet, Calif., is the chief manufacturer of the connector. Although the bus interface connector 44 is preferably located under the dash of the vehicle (to permit easy access), the bus interface connector 44 alternatively may be located in other places in the vehicle.

As noted earlier, the shorting plug 38 and the cover plug 42 may be removed from the connector jack 36, thus exposing the electrical connection sites connected to the electronic devices 32, the power source 40, and the bus interface connector 44. In place of the shorting plug 38 and cover plug 42, an electronics module 50, as shown in FIG. 4, may be connected to the connector jack 36 via a module connector 52. When the module connector 52 is inserted into and engaged with the connector jack 36, the electronic devices 32, the power source 40, and the bus interface connector 44 are each connected to the electronics module 50. While the module connector 52 shown in FIG. 4 uses external bus lines 54 to connect the electronic devices 32 to the electronics module 50, persons of ordinary skill in the art will appreciate that the module connector 52 may be integrated with the electronics module 50, with the bus lines 54 implemented internal to the electronics module 50.

Figure 5:
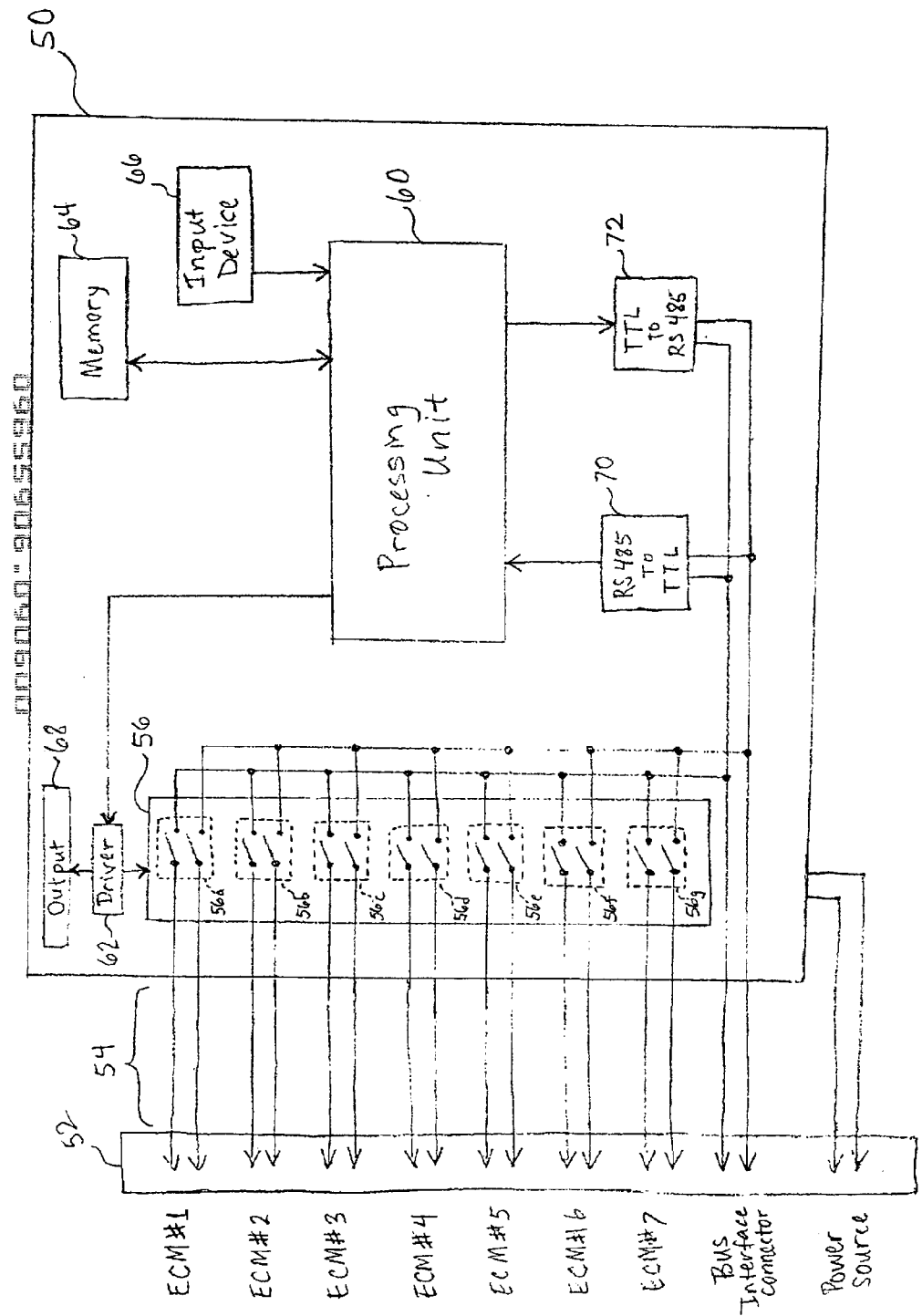
FIG. 5 is a block diagram illustrating the major components of the electronics module and the module connector shown in FIG. 4.

FIG. 5 is a block diagram illustrating the module connector 52 and the major components of the electronics module 50 shown in FIG. 4. In FIG. 5, each of the bus lines 54 from the module connector 52 are connected to a set of switches 56 in the electronics module 50. The set of switches 56 includes a plurality of switching units 56a, 56b, ... 56g, that when closed, connect each of the electronic devices (labeled ECM#1, ECM#2, etc. in FIG. 5) to one another to form the data communication bus. Each of the switching units 56a, 56b, ... 56g opens and closes independently of the other switching units. Accordingly, for example, the switching unit 56a connected to ECM#1 may be set in an open (i.e., nonconducting) state, while the other switching units 56b, 56c, ... 56g connected to ECM#2, ECM#3, etc., may be set in a closed (i.e., conducting) state. In this exemplary configuration, ECM#1 is electrically disconnected from the data communication bus. Likewise, if only the switching unit 56a is set in a closed state, and the other switching units 56b, 56c, ... 56g are set in an open state, only the electronic device ECM#1 remains connected to the data communication bus (along with the bus interface connector). When the switching units 56a, 56b, ... 56g are all set in a closed state, the data communication bus is fully interconnected, thereby allowing all of the electronic devices ECM#1, ECM#2, etc. to communicate data messages with one another.

In FIG. 5, each switching unit includes two switches that open and close in a substantially simultaneous manner. Suitable switches for use in the switching units 56a, 56b ... 56g include relays and solid state devices. While the switching units shown in FIG. 5 are shown having two switches each, switching units in other embodiments of the invention may be comprised of one or any number of switches.

In the embodiment shown in FIG. 5, a processing unit 60 controls the opening and closing of the switching units in the set of switches 56 (e.g., via a driver circuit 62). The processing unit 60 thus controls which of the electronic devices ECM#1, ECM#2, etc. in the vehicle (i.e., the electronic devices 32 shown in FIGS. 3 and 4) are connected to the data communication bus. The processing unit 60 may isolate an electronic device on the data communication bus by opening all of the switching units 56a, 56b, ... 56g, etc., except for the switching unit connecting the device at issue to the data bus. Isolation of electronic devices on the data communication bus is particularly useful during programming of the electronic devices. As discussed below, isolating an electronic device on the data bus during programming prevents the programming codes communicated on the data bus from inadvertently programming or adversely affecting the other electronic devices normally connected to the data bus.

An input device 66, such as a button or key on the electronics module 50 may allow an operator to manually provide instruction to the processing unit 60 to open or close one or more of the switching units in the set of switches 56. The state of the switching units 56a, 56b, . . . 56g (e.g., open or closed) may be indicated by an output device 68, such as an LED, incandescent lamp, or LCD display connected to the processing unit 60 via the driver circuit 62. In this manner, a service technician can manually control which electronic devices are connected to the data communication bus.

Figure 6:
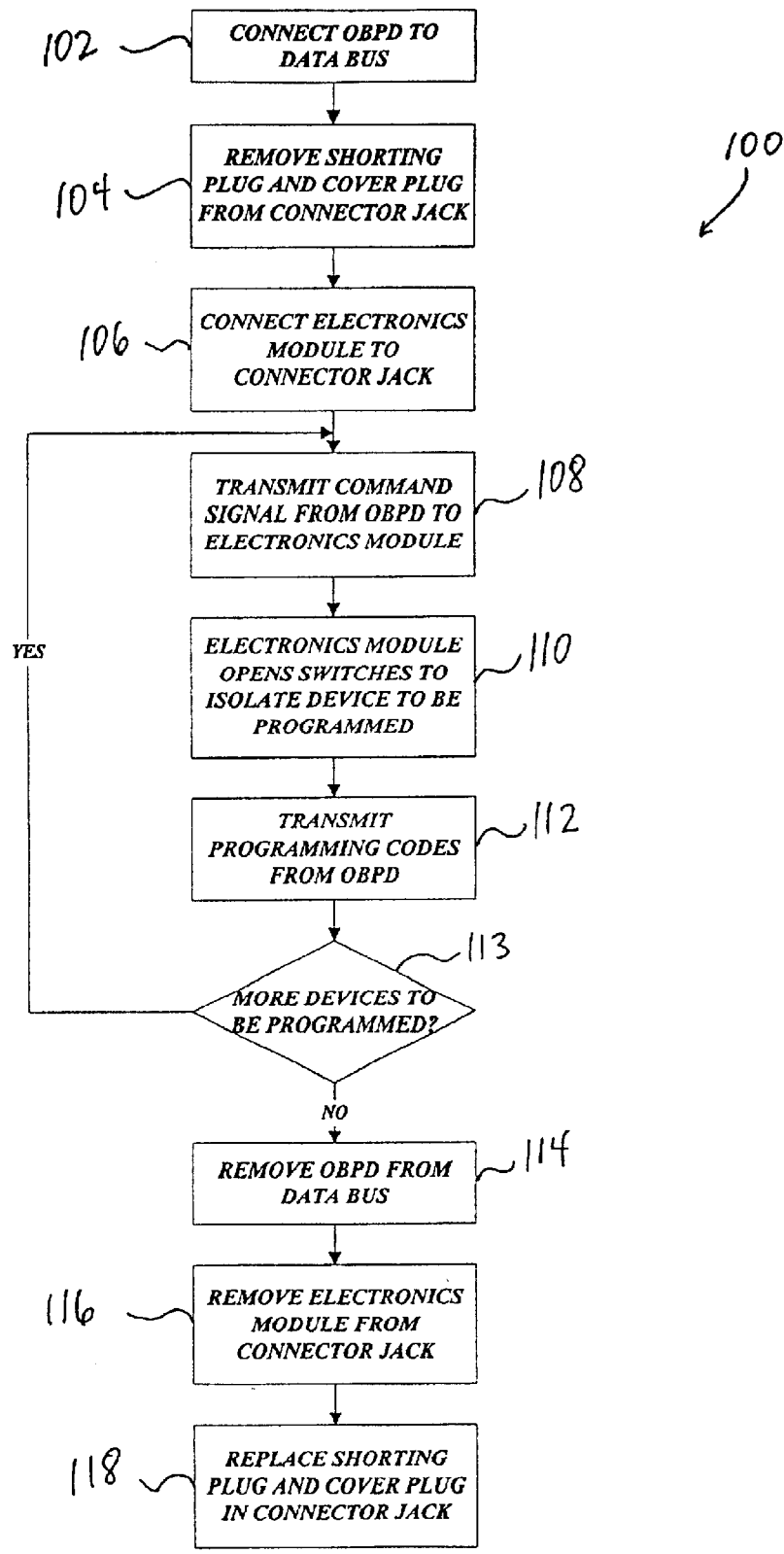
FIG. 6 is a flow diagram illustrating a method in accordance with the present invention for use in programming an electronic device on a vehicle data communication bus as shown in FIG. 5.

FIG. 6 is a flow diagram of a method 100 in accordance with the present invention that may be used in programming an electronic device on a vehicle data communication bus. Beginning at block 102, an off-board programming device (OBPD) is connected to the data communication bus via the bus interface connector 44 (shown in FIGS. 3 and 4). As noted earlier, the bus interface connector 44 may be conveniently located under the dashboard of the vehicle.

Proceeding to block 104 in FIG. 6, the shorting plug 38 and cover plug 42 (shown in FIG. 3) are removed from the connector jack 36. In block 106, the electronics module 50 (shown in FIGS. 4 and 5) is connected to the connector jack 36 by inserting the module connector 52 into the connector jack 36.

In block 108, the OBPD transmits a command signal to the electronics module 50 via the data communication bus. The command signal instructs the electronics module 50 to open all of the switching units 56a, 56b, etc., except for the switching unit connecting the electronic device to be programmed (e.g., switching unit 56f if electronic device ECM#6 is to be programmed). In this manner, the electronic devices that are not to be programmed by the OBPD are electrically disconnected from the data bus and isolated from the OBPD.

More specifically, the OBPD may transmit the command signal through the bus interface connector 44 to a signal converter in the electronics module 50. In the embodiment shown in FIG. 5, an RS485 to TTL signal converter 70 converts the command signal from a J1708-compliant signal to a signal format (e.g., TTL) understood by the processing unit 60. The processing unit 60 may also reference instructions or information stored in a memory 64 to interpret the command signal received from the OBPD. After interpreting the command signal, the processing unit 60 outputs an appropriate signal to the driver 62 to set each of the switching units 56a, 56b, . . . 56g, in an open state, except for the switching unit connected to the device to be programmed, as indicated in block 110.

Preferably, the OBPD automatically issues the command signal referenced in block 108 when programming software executed by the OBPD is initiated. Alternatively, instead of requiring the OBPD to transmit a command signal, the electronics module 50 may detect when an OBPD is connected to the data bus (e.g., by recognizing unique program codes transmitted on the data bus, or by polling the bus interface connector 44 for the presence of the OBPD). Instructions stored in the memory 64 may direct the electronics module 50 to automatically isolate the electronic device to be programmed based on the information observed by the electronics module 50. The electronics module 50 may poll the bus interface connector 44 by sending a polling signal to a TTL to RS485 signal converter 72 that outputs a J1708-compliant signal onto the data bus. The OBPD, which is connected to the data bus via bus interface connector 44, would recognize the polling signal on the data bus and answer the inquiry from the electronics module 50 by transmitting a response signal on the data bus. The OBPD, or the processing unit 60, may also poll for the presence of the electronic device to be programmed and notify the operator via the output 68 or a display on the OBPD or the electronics module 50 if the device is absent.

After the electronics module 50 isolates the electronic device to be programmed, in block 112 the OBPD executes a vendor component program (VCP) that issues the programming codes that program the electronic device. After the electronic device has been programmed, the OBPD determines in decision block 113 whether there are additional devices to be programmed by the OBPD. If there are additional devices to be programmed (i.e., the OBPD is configured to execute multiple VCPs), the OBPD returns to block 108 and issues a new command signal to electrically disconnect all of the electronic devices from the data bus, except for the electronic device to be programmed by the particular VCP. The actions taken in blocks 108, 110, and 112 of isolating and programming an electronic device on the data bus are repeated for each VCP until all of the electronic devices to be programmed are programmed.

Once all of the VCPs have been executed, the OBPD may be disconnected from the bus interface connector 44, as indicated in block 114. The electronics module 50 may also be removed from the connector jack 36, as indicated in block 116. In its place, the shorting plug 38 and the cover plug 42 are reinserted into the connector jack 36, as indicated in block 118.

In accordance with the present invention, the electronics module 50 may also monitor the data bus for purposes of diagnostics. When the electronics module 50 is connected to the connector jack 36, the processing unit 60 is capable of monitoring data on the data communication bus via the RS485 to TTL converter 70. The processing unit 60 is also capable of transmitting data on the data communication bus via the TTL to RS485 converter 72. In particular, the processing unit 60 is capable of monitoring data communicated on the data communication bus for abnormalities.

As noted in the background of the invention, abnormalities in data communicated on the data bus may include, for example, the communication of invalid characters, excess packet length, babbling, and corrupt packets. The processing unit 60 may also monitor the bus for signs of faulty hardware conditions. If an external programming device, such as the OBPD discussed above, is connected to the data bus via the bus interface connector 44 for purposes of programming electronic devices on the data bus, the processing unit 60 may direct that one or more of the monitoring functions performed by processing unit 60 be disabled or ignored during the transmission of programming codes so that the processing unit 60 does not interpret the programming codes as invalid or abnormal data.

Figure 7:
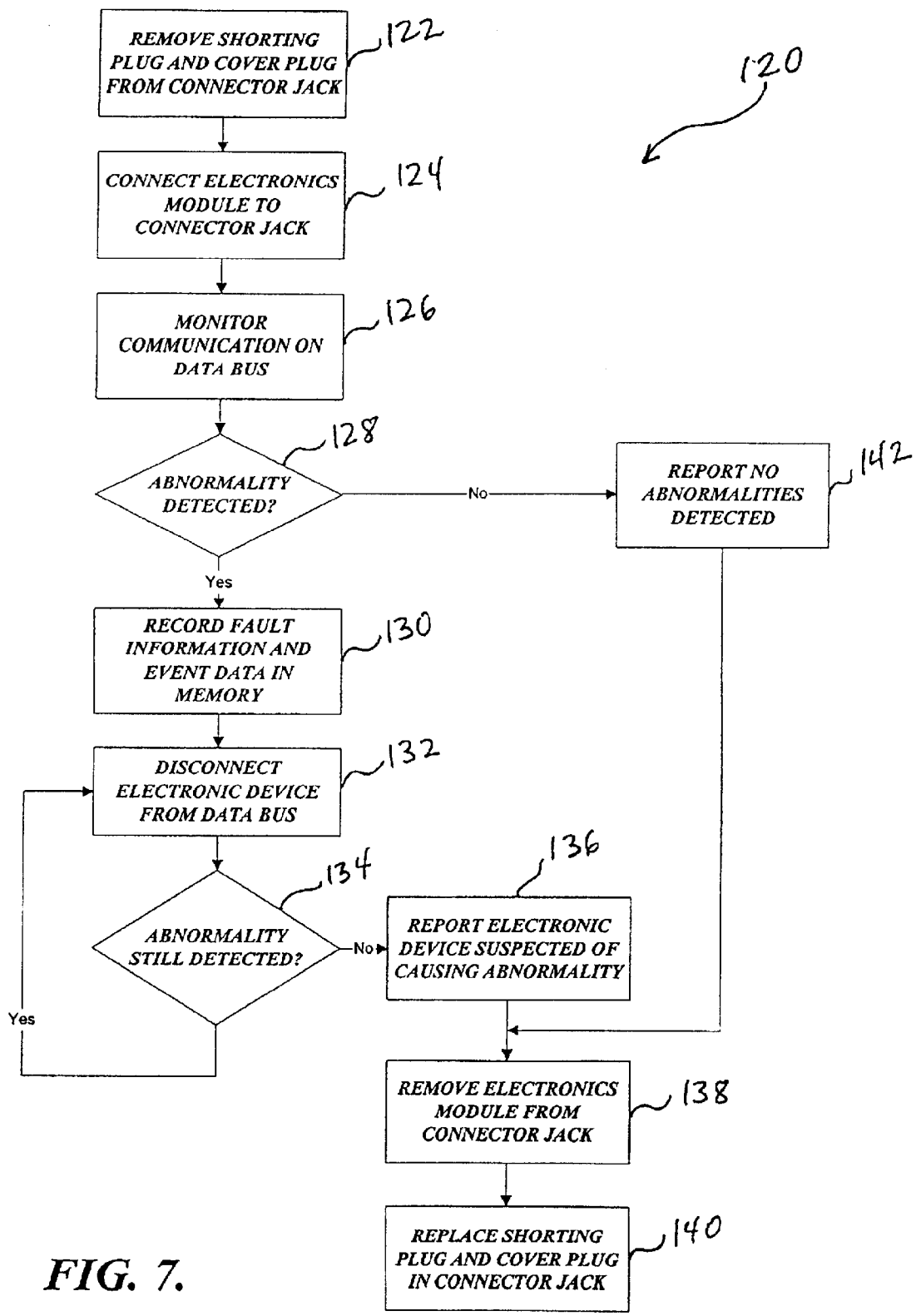
FIG. 7 is a flow diagram illustrating a method in accordance with the present invention for use in diagnostics of electronic devices on a vehicle data communication bus as shown in FIG. 5.

FIG. 7 is a flow diagram of a method 120 in accordance with the present invention that may be used for diagnosing potential problems with electronic devices connected to the data communication bus. Beginning at block 122, the shorting plug 38 and cover plug 42 are removed from the connector jack 36. In block 124, the electronics module 50 is engaged with the connector jack 36 by inserting the module connector 52 into the connector jack 36. In block 126, the electronics module 50 begins to monitor data being transmitted on the data communication bus.

In a decision block 128, the processing unit 60 determines whether an abnormality in data communicated on the data bus has been detected. If no abnormalities have been detected after a predetermined amount of time, the processing unit 60 produces a report in block 142 that no abnormalities were detected. The processing unit 60 may send this report to the output 68 (e.g., by lighting a specified LED or providing certain message text in the output 68). Alternatively, the processing unit 60 may transmit the report to a display elsewhere in the vehicle via the data communication bus.

After reporting that no abnormalities were detected on the data bus, the electronics module 50 may be removed from the connector jack 36, as indicated in block 138. In place of the electronics module 50, the shorting plug 38 and cover plug 42 are reinserted into the connector jack 36, as indicated in block 140.

Returning to decision block 128, if the processing unit 60 detects an abnormality in the data transmitted on the data bus, the processing unit 60 may record fault information, including the abnormal data, in memory 64, as indicated in block 130, for later access and review by a service technician.

The recorded fault information may include special codes identifying the detected fault. Information recorded in the memory 64 may also include event data such as the actual data and bus conditions detected on the bus (which may include data communicated prior to the detected abnormality that is stored in a buffer) and time information identifying the time of the detected abnormality. Information relating to a detected abnormality may also be transmitted to a display or an output, such as output 68.

While the recorded fault information and event data may be sufficient for a service technician to diagnose the problem (thus permitting the electronics module 50 to be removed from the data bus), in accordance with a further aspect of the invention, the processing unit 60 may proceed to automatically attempt to identify which of the electronic devices ECM#1, ECM#2, etc. connected to the data communication bus is causing the faulty or abnormal data. In that regard, the electronics module 50 is kept connected to the data communication bus.

In block 132, the processing unit 60 electrically disconnects one of the electronic devices from the data bus by opening the switching unit in the set of switches 56 that connects the electronic device to the data bus. The processing unit 60 continues to monitor the data being transmitted on the data communication bus, and in decision block 134, determines whether the abnormality is still present. If the abnormal data or fault condition continues to be present on the data bus, the processing unit 60 returns to block 132 and disconnects another electronic device from the data communication bus. The processing unit 60 continues to monitor the data on the data communication bus to determine whether the abnormality is still present. This process of disconnecting devices and monitoring the data bus for the abnormality continues until the abnormality is no longer present.

Once the abnormality is no longer detected, the processing unit 60 may assume that the last electronic device to be disconnected from the data communication bus is the device causing the abnormality. In block 136, the processing unit 60 produces a report indicating which of the electronic devices is suspected of causing the abnormality. This report may be sent to the output 68 or transmitted to a display elsewhere in the vehicle via the data communication bus.

Preferably, the processing unit 60 electrically disconnects electronic devices in reverse order of their criticality to the operation of the vehicle (i.e., disconnecting the least critical electronic devices first). The processing unit may reference, for example, information stored in the memory 64 to determine which electronic devices are designated least critical and which electronic devices are designated most critical. The processing unit 60 may also reconnect disconnected devices that have been shown to be not causing the abnormality, while the processing unit 60 continues to disconnect other electronic devices in search of the offending device.

After reporting the identity of the electronic device suspected of causing the abnormality, the electronics module 50 may be removed from the connector jack 36, as indicated in block 138, with the shorting plug and cover plug being reinserted in the connector jack 36, as indicated in block 140.

Although the fault information and event data recorded in block 130 is shown in FIG. 7 as a discrete action, it is within the scope of the present invention, and indeed preferable in some circumstances, for the electronics module 50 to continuously record event data in the memory 64 once an abnormality is detected. A continuously-kept log of this type may be helpful to a service technician in tracking both the presence of the abnormality and the process of disconnecting electronic devices from the bus in block 132.

To download fault information and event data recorded in the memory 64, a separate off-board diagnostics tool, or other computing device (not shown), may be connected to the electronics module 50 via the bus interface connector. The processing unit 60 may output the fault information and event data from the memory 64 to the diagnostic tool via the TTL to RS485 converter 72. Alternatively, the electronics module 50 may include a separate port or wireless transmitter for downloading the fault information and event data to the diagnostics tool. In yet another alternative, the electronics module 50 may include a display, such as output 68, for displaying the fault information and event data directly on the electronics module 50.

In the programming and diagnostic methods 100 and 120 described above, the electronics module 50 is temporarily connected to the connector jack for purposes of programming or diagnostics. Otherwise, the shorting plug 38 and cover plug 42 remain engaged with the connector jack during normal operation of the vehicle.

Alternatively, the electronics module 50 may be connected to the connector jack 36 on a more permanent basis to provide on-going real-time monitoring and protection of the data bus. In the event of a detected abnormality, the electronics module 50 notifies the operator of the vehicle and enters a diagnostics mode of operation. The electronics module 50 may then proceed to electrically disconnect electronic devices from the data bus until the faulty device is disconnected and the abnormalities disappear, as discussed in reference to blocks 130, 132, 134, and 136 in FIG. 7.

The electronics module 50 may also be permanently installed in a vehicle as standard equipment. In such an installation, a module connector 52 and a connector jack 36 are not necessary. The electronics module 50 may be installed in the vehicle as a separate unit with its own housing and its own processing unit 60, or it may be embedded in an larger electronic control apparatus in the vehicle. In regard to the latter, the electronic control apparatus may have a processing unit that controls other aspects of the vehicle, in addition to implementing the control processes provided by the present invention. An embedded embodiment is desirable in terms of reducing costs, especially in mass production of vehicles.

While several embodiments of the invention have been illustrated and described, it will be appreciated that various changes can be made therein without departing from the spirit and scope of the invention. For example, it is possible that two or more electronic devices may be connected to the data communication bus via a single switching unit in the electronics module 50. The electronics module 50 may also be provided with a scalable architecture that allows the addition of switching units as new electronic devices are connected to the vehicle's data communication bus. Furthermore, one or more of the switching units 56a, 56b, etc., may be physically housed apart from the housing of the electronics module 50 and still be considered part of the electronics module. If remotely housed, the switching units 56a, 56b, etc., would have a communication link with the processing unit 60 to permit the electronics module 50 to control the opening and closing of the switching units. The scope of the invention, therefore, should be determined in reference to the following claims.

The embodiments of the invention in which an exclusive property or privilege is claimed are defined as follows:

1. A system for use in programming and diagnostics of electronic devices in a vehicle that communicate via a data communication bus in the vehicle, the system comprising:
   (a) a connector jack having a plurality of electrical connection sites configured for electrical connection to the electronic devices in the vehicle;
   (b) a shorting plug configured to removably engage the connector jack, the shorting plug electrically interconnecting the plurality of electrical connection sites to form the data communication bus when the shorting plug is engaged with the connector jack; and
   (c) an electronics module configured to removably engage the connector jack in place of the shorting plug, the electronics module including a plurality of switching units that electrically connect to the plurality of electrical connection sites in the connector jack when the electronics module is engaged with the connector jack, wherein the switching units, when set in a closed state, electrically interconnect the electrical connection sites in the connector jack to form the data communication bus, each switching unit being operable independently from the other switching units so that one or more of the switching units may be set in an open state to electrically disconnect an electronic device from the data communication bus.

2. The system of claim 1, wherein the connector jack further includes an electrical connection site for connection to a power source.

3. The system of claim 1, wherein the connector jack further includes an electrical connection site for connection to a bus interface connector.

4. The system of claim 1, further comprising a cover plug configured to removably engage the connector jack to cover one or more of the electrical connection sites.

5. The system of claim 1, wherein one or more of the switching units comprise a plurality of switches that are collectively set in an open or closed state in the switching unit.

6. The system of claim 1, wherein the electronics module further includes a processing unit in communication with the switching units for controlling the opening and closing of the switching units in accordance with instructions carried out by the processing unit.

7. The system of claim 6, wherein the processing unit is in communication with the data communication bus, and wherein the instructions carried out by the processing unit are received via the data communication bus from an external programming device connected to the data communication bus.

8. The system of claim 6, wherein the electronics module further includes a memory in communication with the processing unit, the memory having instructions stored therein, and wherein the instructions carried out by the processing unit are received from the memory.

9. The system of claim 6, wherein the electronics module further includes a user input in communication with the processing unit, and wherein the instructions carried out by the processing unit are received from the user input.

10. The system of claim 1, wherein the electronics module further includes a processing unit in communication with the data communication bus for monitoring data communicated on the data communication bus and selectively setting one or more of the switching units in an open or closed state based on the data communicated on the data communication bus.

11. The system of claim 10, wherein the processing unit is configured to set one or more of the switching units in an open state to electrically disconnect one or more electronic devices from the data communication bus if an abnormality in the data communicated on the data communication bus is detected by the processing unit.

12. The system of claim 11, wherein the processing unit electrically disconnects electronic devices in a sequence until the processing unit no longer detects the abnormality on the data communication bus.

13. The system of claim 11, wherein the processing unit is configured to electrically disconnect electronic devices in a determined order of criticality to the operation of the vehicle, from an electronic device designated least critical to an electronic device designated most critical.

14. The system of claim 10, wherein the electronics module further includes a memory in communication with the processing unit for recording information related to an abnormality detected by the processing unit in the data communicated on the data communication bus.

15. The system of claim 14, wherein the processing unit is configured to record information related to a detected abnormality for a period of time.

16. The system of claim 10, wherein the electronics module further includes an output device in communication with the processing unit, and wherein the processing unit is configured to report via the output device information related to an abnormality detected by the processing unit in the data communicated on the data communication bus.

17. A method for use in programming electronic devices in a vehicle that communicate via a data communication bus in the vehicle, comprising:
   (a) connecting the electronic devices in the vehicle to the data communication bus via switching units;
   (b) connecting a programming device to the data communication bus for transmitting programming codes via the data communication bus to an electronic device in the vehicle that is to be programmed, the switching unit connecting the electronic device to be programmed being set in a closed state;
   (c) electrically disconnecting from the data communication bus other electronic devices in the vehicle that are not to be programmed, by setting the switching units that connect the other electronic devices to the data communication bus in an open state; and
   (d) transmitting the programming codes from the programming device to the electronic device to be programmed via the data communication bus.

18. The method of claim 17, further comprising connecting the other electronic devices to the data communication bus by setting the switching units that connect the other electronic devices in a closed state, after transmission of the programming codes is completed.

19. The method of claim 17, wherein connecting a programming device to the data communication bus comprises connecting the programming device to a bus interface connector that is electrically connected to the data communication bus.

20. The method of claim 17, further comprising:
(e) providing a connector jack having a plurality of electrical connection sites, wherein each electrical connection site is electrically connected to at least one of the electronic devices in the vehicle;
(f) providing an electronics module that removably engages the connector jack, the electronics module including the switching units that connect the electronic devices to the data communication bus; and
(g) instructing the electronics module to electrically disconnect from the data communication bus the other electronic devices that are not to be programmed by setting in an open state the switching units that connect the other electronic units to the data communication bus.

21. The method of claim 20, further comprising providing a shorting plug configured to removably engage the connector jack in place of the electronics module, the shorting plug interconnecting the plurality of electrical connection sites to form the data communication bus when the shorting plug is engaged with the connector jack.

22. The method of claim 21, further comprising reconnecting to the data communication bus the other electronic devices that were electrically disconnected from the data communication bus by disengaging the electronics module from the connector jack and engaging the shorting plug with the connector jack.

23. A method for use in diagnostics of electronic devices in a vehicle that communicate via a data communication bus in the vehicle, the method comprising:
(a) connecting the electronic devices in the vehicle to the data communication bus via switching units;
(b) monitoring data communicated by the electronic devices on the data communication bus for abnormalities; and
(c) if an abnormality is detected, setting at least one of the switching units in an open state to electrically disconnect from the data communication bus at least one of the electronic devices to help identify the electronic device that is causing the abnormality.

24. The method of claim 23, wherein the electronic devices are electrically disconnected from the data communication bus in a sequence until the abnormality is no longer detected on the data communication bus.

25. The method of claim 24, wherein the electronic devices are electrically disconnected in a determined order of criticality to the operation of the vehicle, from an electronic device designated least critical to an electronic device designated most critical.

26. The method of claim 23, further comprising:
(a) providing an electronics module that includes the switching units that connect the electronic devices to the data communication bus; and
(b) providing a processing unit in communication with the data communication bus,
wherein the processing unit monitors the data communicated by the electronic devices on the data communication bus, and if an abnormality in the data is detected by the processing unit, the processing unit instructs the electronics module to set at least one of the switching units in an open state to electrically disconnect at least one of the electronic devices from the data communication bus.

27. The method of claim 26, further comprising providing a memory in communication with the processing unit and storing in the memory information relating to an abnormality detected by the processing unit.

28. The method of claim 26, further comprising:
(a) providing an output device in communication with the processing unit;
(b) producing a report that includes information relating to the detected abnormality; and
(c) transmitting the report to the output device.

29. An electronics module for use in programming and diagnostics of electronic devices in a vehicle that are configured to communicate via a data communication bus, the electronics module comprising:
(a) a plurality of switching units configured to connect to the electronic devices in the vehicle, wherein when the switching units are set in a closed state, the electronic devices in the vehicle are interconnected in the electronics module to form the data communication bus, and when set in an open state, the switching units electrically disconnect the electronic devices from the data communication bus; and
(b) a processing unit in communication with the plurality of switching units for selectively setting each of the switching units in an open or closed state.

30. The electronics module of claim 29, wherein the processing unit is configured to set each of the switching units in an open or closed state in accordance with instructions carried out by the processing unit.

31. The electronics module of claim 30, wherein the processing unit is in communication with the data communication bus, and wherein the instructions carried out by the processing unit are received via the data communication bus from an external programming device connected to the data communication bus.

32. The electronics module of claim 30, further comprising a memory in communication with the processing unit, wherein the instructions carried out by the processing unit are received from the memory.

33. The electronics module of claim 30, further comprising a user input in communication with the processing unit, wherein the instructions carried out by the processing unit are received from the user input.

34. The electronics module of claim 29, wherein the processing unit is configured to monitor data communicated on the data communication bus and selectively set one or more of the switching units in an open or closed state based on the data communicated on the data communication bus.

35. The electronics module of claim 34, wherein the processing unit is configured to selectively set one or more of the switching units in an open state to electrically disconnect one or more of the electronic devices from the data communication bus if the processing unit detects an abnormality in the data communicated on the data communication bus.

36. The electronics module of claim 35, wherein the processing unit is configured to electrically disconnect electronic devices in a sequence until the processing unit no longer detects the abnormality on the data communication bus.

37. The electronics module of claim 35, wherein the processing unit is configured to electrically disconnect electronic devices in a determined order of criticality to the operation of the vehicle, from an electronic device designated least critical to an electronic device designated most critical.

38. The electronics module of claim 34, further comprising a memory in communication with the processing unit for recording information related to the detected abnormality.

39. The electronics module of claim 34, further comprising an output device in communication with the processing unit, wherein the processing unit is configured to report information to the output device relating to the detected abnormality.

40. The electronics module of claim 29, further comprising a module connector having a plurality of electrical connection sites configured to connect to the electronic devices in the vehicle, wherein the plurality of switching units in the electronics module is connected to the plurality of electrical connection sites in the module connector.

* * * * *